May 17, 1927.

C. E. BENNETT 1,629,334

AUTOMATIC FEEDER

Filed Oct. 6, 1926

C.E.Bennett Inventor

By C.A.Snow & Co.
Attorneys.

May 17, 1927.
C. E. BENNETT
1,629,334
AUTOMATIC FEEDER
Filed Oct. 6, 1926
2 Sheets-Sheet 2
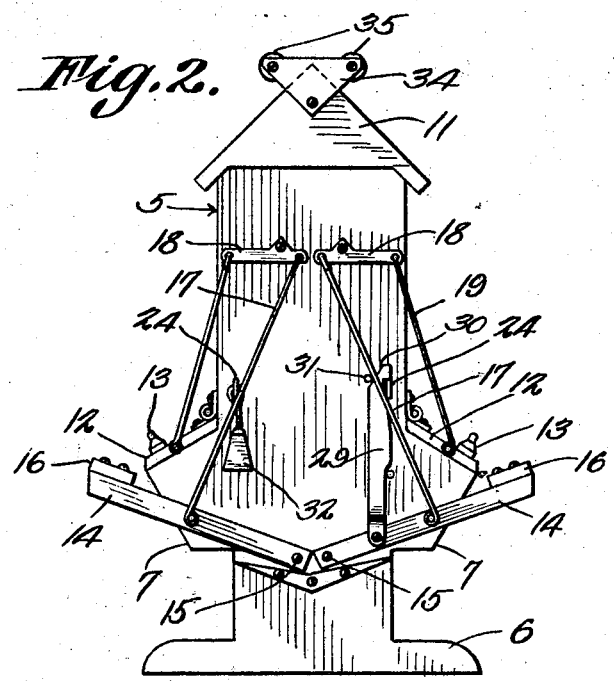
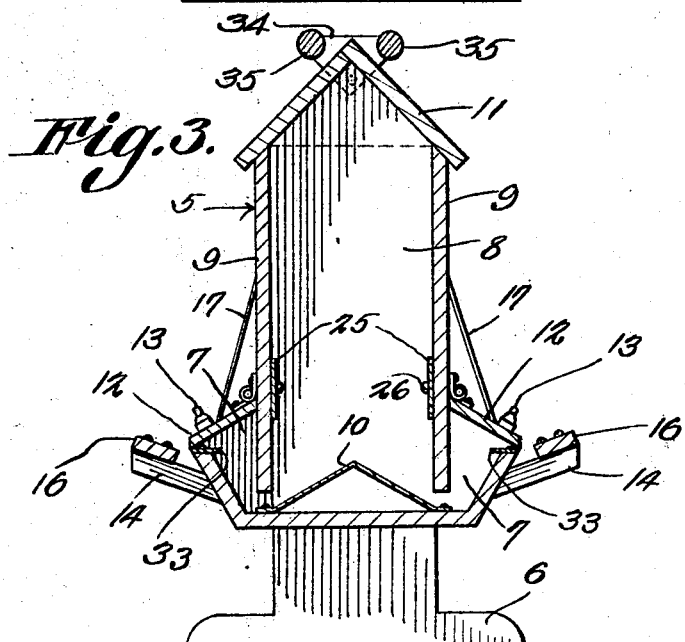
C. E. Bennett, Inventor
By C. A. Snow & Co., Attorneys Patented May 17, 1927.

1,629,334

UNITED STATES PATENT OFFICE.

CADWELL E. BENNETT, OF DE SOTO, KANSAS.

AUTOMATIC FEEDER.

Application filed October 6, 1926. Serial No. 139,898.

This invention relates to feeders, the primary object of the invention being to provide a feeder embodying a hopper and troughs fed by the hopper, the hopper and troughs being normally closed to exclude foreign matter.

An important object of the invention is to provide a movable perch, and means controlled by the perch for moving the trough closures to their open positions so that a fowl standing on the perch may have access to the interior of the trough.

Another object of the invention is to provide means on the hinged covers of the troughs for engaging the sides of the hopper with such force, when the hinged closures are opened as to jar the material in the hopper and cause it to fall into the troughs.

Another important object of the invention is the provision of means within the hopper and operated by the action of the hinged closures to further agitate the material within the hopper to insure the same being fed to the troughs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is an end elevational view thereof.

Figure 3 is a vertical sectional view taken at right angles to Figure 1.

Figure 1:
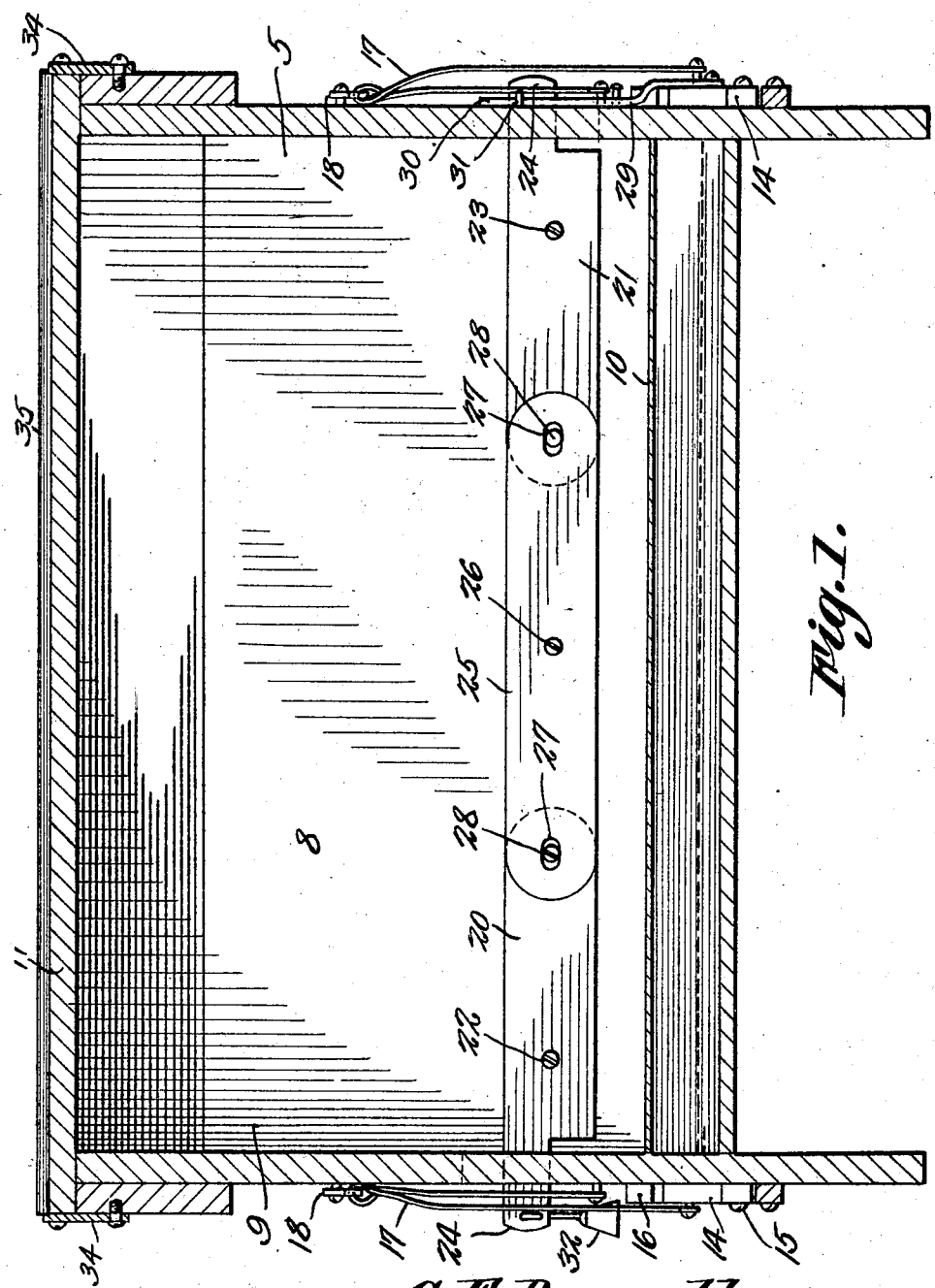
Figure 1 is a vertical sectional view through a device constructed in accordance with the invention.

Referring to the drawings in detail, the device includes a body portion indicated generally by the reference character 5, the ends of the body portion being provided with supports 6 whereby the device may rest on a suitable supporting surface without danger of the same toppling over.

The reference character 7 designates troughs that are disposed on opposite sides of the body portion and arranged at the base of the hopper 8, which hopper includes side walls 9 that have their lower ends arranged in spaced relation with the bottom of the troughs so that material may pass from the hopper into the troughs.

A spreading device indicated at 10 is secured within the base of the hopper and acts to direct grain laterally into the troughs 7 as clearly shown by Figure 3 of the drawings. Closing the upper end of the hopper is a cover 11, which may be removed from its position as shown in the drawings to allow the hopper to be filled with grain or other feed.

Hinged closures indicated at 12 are provided for closing the feed troughs, the closures being supplied with knockers 13 adapted to move into engagement with the side members 9 of the hopper, when the closures are moved to their open positions to jar the material held within the hopper and cause it to be fed downwardly into the troughs.

Associated with each trough is a movable perch that embodies arms 14 pivotally connected to the ends of the hopper at 15, the arms being connected by means of the bar 16. A link indicated at 17 is connected with each arm 14, the upper end of each link being connected with one end of the arm 18 associated therewith and which is pivotally connected to the hopper.

The forward end of each arm 18 has connection with the upper end of a link 19 while the lower end of the link connects with the end of the closure 12 associated therewith to the end that when the perch is moved downwardly under the weight of poultry standing thereon, the forward end of the arms 18 are moved upwardly elevating the closure 12 associated therewith to uncover the trough and permit access to the trough.

To further insure the feeding of material from the hopper to the troughs, an agitator is employed and secured to the inner surface of each side wall of the hopper proper, each agitator including end members 20 and 21 respectively, the end member 20 being pivotally mounted on the pin 22, while the member 21 is pivotally mounted at 23, each end member however being provided with an extension 24 extending through openings in the end walls of the hopper.

A central member 25 forms a part of each agitator and is pivotally supported at 26, the ends thereof being provided with elongated openings 27 through which the pins 28 extend, so that movement of the end members will be transmitted to the central member.

Pivotally connected with one of the arms 14 of each perch, is a vertical latch member 29 that is adapted to engage over the upper edge of the extension 24 of the agitator, associated therewith, with the result that when the perch moves downwardly, downward movement is directed to the agitator loosening the material within the hopper to cause it to gravitate to the bottom thereof.

The upper edge of each latch member is beveled as at 30 adapted to contact with the pin 31 extending outwardly from the end of the hopper to cause the latch member to be moved inwardly as the perch moves upwardly and the closure 12 is moved to its closed position, thereby resetting the latch member to insure the operation of the agitator associated therewith upon downward movement of the perch.

At the opposite end of each agitator is a weight 32 that is adapted to return the agitator to its initial position after it has been operated by the weight of fowl standing on the perch.

It might be further stated that in order to prevent the material contained within the troughs, from being thrown from the troughs during the feeding, plates 33 are secured along the upper edges of the troughs and overhang the inner edges of the troughs defining protecting lips.

Pivotally mounted on the cover of the hopper are substantially triangular end plates 34 that are connected by the ends of the perch rods 35, with the result that should a fowl endeavor to perch on one of the rods 35, the rod will of course swing forwardly into engagement with the cover of the hopper, making it impossible for a fowl to perch thereon.

Should a fowl perch on the opposite rod, the device will of course swing in the opposite direction.

While the invention is shown as a feeding device for feeding poultry, it is to be understood that the principles of the invention may be carried out in a feeding device for feeding animals such as hogs, sheep or the like.

I claim:

1. A poultry feeder including a hopper, a trough at each side of the hopper and arranged adjacent to the bottom thereof, said troughs being fed with material from the hopper, a hinged closure for each trough, a movable perch associated with each trough, connecting links for connecting the perches and closures, said closures adapted to be moved by the movement of the perches, knockers carried by the closures and adapted to move to engage the hopper to jar material within the hopper, and agitating members mounted within the hopper and movable by the action of the perches to feed material to the troughs.

2. A poultry feeder including a hopper, a trough at each side of the hopper and arranged adjacent to the bottom thereof, said troughs being fed with material from the hopper, movable perches associated with the troughs, agitators including pivotally connected members, pivotally mounted on the inner surfaces of the hopper, means connected with the perches and having connection with the agitating members for moving the agitating members when the perches are moved, and closures for the troughs.

3. A poultry feeder including a hopper, a trough at each side of the hopper and arranged adjacent to the bottom thereof, said troughs being fed with material from the hopper, movable perches, agitating members, pivotally supported within the hopper, each of said agitating members including end members having portions thereof extended through the end walls of the hopper, a central member forming a part of each agitator and having pivotal connection with the end members, and means operated by the perches for engaging the portions of the end members extended through the ends of the hopper to move the agitators.

In testimony that I claim the foregoing as my own, I have hereto affixed my signature.

CADWELL E. BENNETT.